March 1, 1966
J. L. MOHAR
3,237,885
SPACE CRAFT
Filed June 5, 1961
3 Sheets-Sheet 1
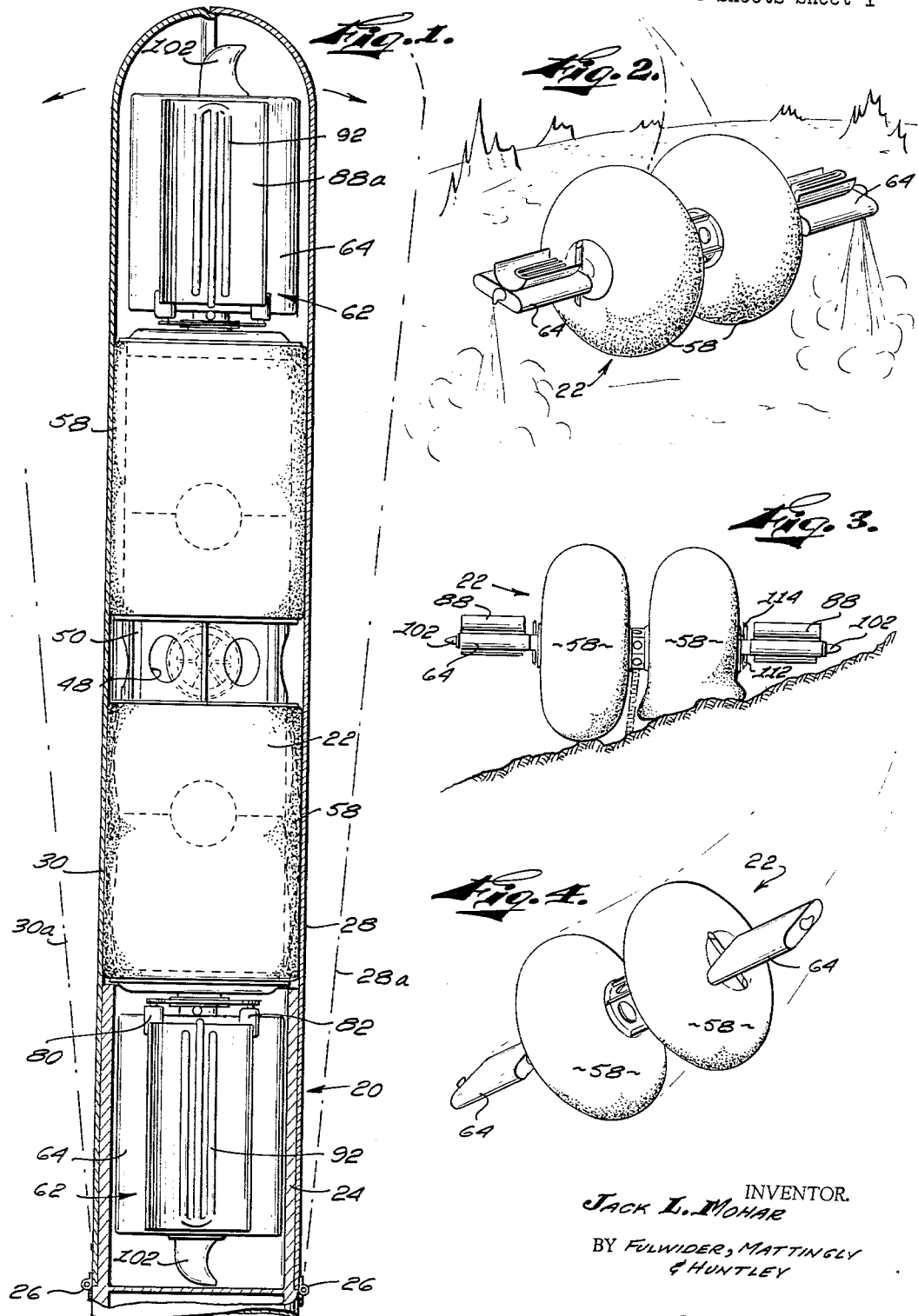
INVENTOR.
JACK L. MOHAR
BY FULWIDER, MATTINGLY
& HUNTLEY
ATTORNEYS March 1, 1966 J. L. MOHAR 3,237,885
SPACE CRAFT
Filed June 5, 1961 3 Sheets-Sheet 2
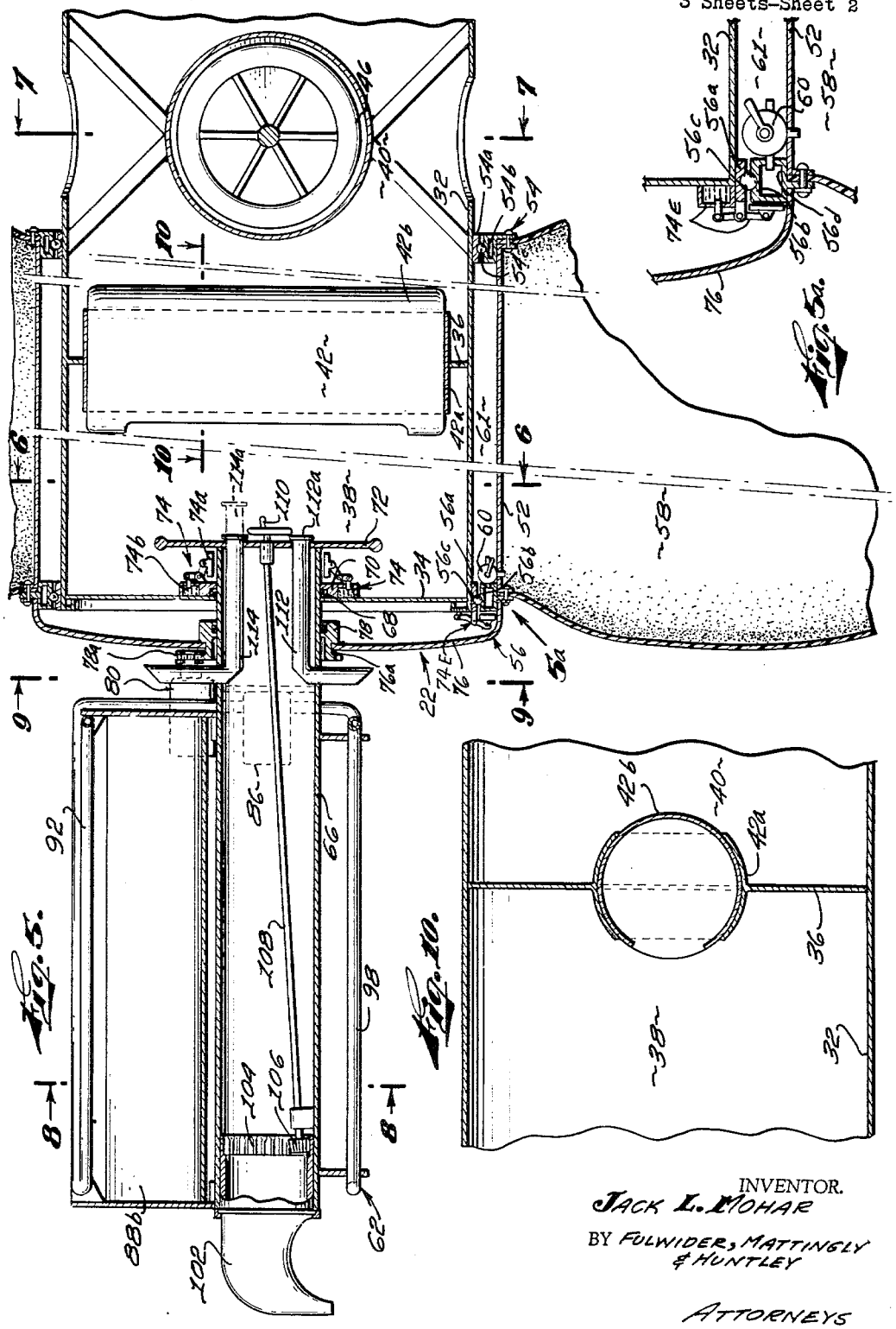
INVENTOR.
JACK L. MOHAR
BY FULWIDER, MATTINGLY
& HUNTLEY
ATTORNEYS

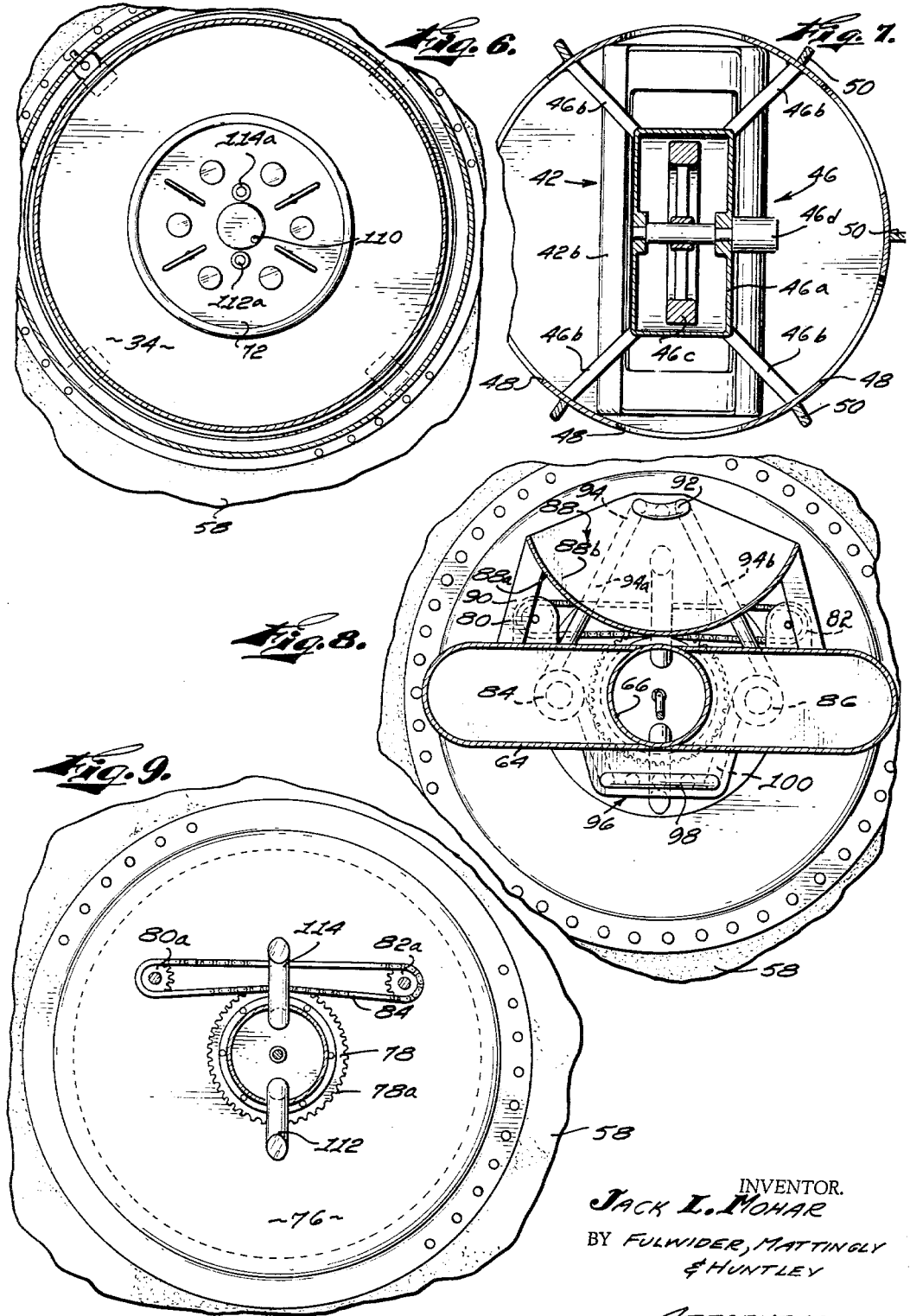

United States Patent Office 3,237,885
Patented Mar. 1, 1966

3,237,885
SPACE CRAFT
Jack L. Mohar, 41 W. Arbor, Long Beach, Calif.
Filed June 5, 1961, Ser. No. 114,758
9 Claims. (Cl. 244—1)

This invention relates to space craft, but more particularly to improvements therein affecting travel over the surface of a planet or travel through space in leaving or entering a planet's atmosphere.

Although the design and construction of space vehicles is presently in a very early stage, it is becoming increasingly evident that certain heretofore common principles of construction and operation are to be employed in space ships. Such basic principles are founded primarily in tradition, in that they have been employed for many years in the transportation fields pertaining to aircraft and other types of vehicles. Typically, proposed space craft used for landing on and exploring other planets is frequently depicted as employing drive wheels within an endless track as used today on what is described as a Caterpillar tractor.

It is believed that traditional concepts of design fail to provide the most desirable structure, particularly in view of the nature of the terrain and other environmental conditions on many of the planets. For instance, the surface of the Moon is formed with chasms and plateaus and is comprised to a very large degree with extremely fine dust. These conditions are virtually impossible to negotiate with conventional tractor-type propulsion means, since it is frequently necessary for the craft to jump over these and other obstacles.

In view of the foregoing it is an object of the present invention to provide a space craft which can be propelled over the surface of the Moon or any other planet.

Another object of this invention is to provide space craft which utilizes several very large and soft balloon-like tires.

Another object of this invention is to provide space craft as above described wherein is included means for automatically inflating such balloon-like tires.

Another object of this invention is to provide space craft as above described having a source of power for rotating the tires for propelling the space craft along the surface of a planet.

Another object is to provide space craft as above described wherein the tires are rotatable while in flight to prevent excessive heating or cooling thereof.

Another object of this invention is to provide means for utilizing solar energy as the motivating power for rotating such balloon-like tires for purposes of propulsion and to prevent prolonged exposure to extreme temperature conditions.

Another object is to provide space craft as characterized above wherein is included a gyroscope as a means for maintaining a plane of reference about which the tires may be rotated while the craft is in flight.

Another object of this invention is to provide space craft having passenger compartments positioned within said large balloon-like tires.

Another object of this invention is to provide braking means for controlling the operation of the tires for stopping or turning the craft.

Another object of this invention is to provide a space craft which is simple and inexpensive to manufacture and which is rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

FIGURE 1 is a vertical sectional view of the last stage of a rocket, the space craft therein being shown in elevation;

FIGURE 2 is a perspective view of the craft while in operation;

FIGURE 3 is a front elevational view of the craft while being propelled across the surface of a planet;

FIGURE 4 is a perspective view of the craft re-entering the Earth's atmosphere;

FIGURE 5 is a fragmentary sectional view taken along the center line of the craft;

FIGURE 5a is a fragmentary sectional view of the inflation control means shown in FIGURE 5;

FIGURE 6 is a sectional view taken substantially along line 6—6 of FIGURE 5;

FIGURE 7 is a sectional view taken substantially along line 7—7 of FIGURE 5;

FIGURE 8 is a sectional view taken substantially along line 8—8 of FIGURE 5;

FIGURE 9 is a sectional view taken substantially along line 9—9 of FIGURE 5; and FIGURE 10 is a sectional view taken substantially along line 10—10 of FIGURE 5.

Like reference numerals identify corresponding parts throughout the several views of the drawings.

Referring to FIGURE 1 of the drawings, there is shown therein a portion of a rocket having a last or final stage 20 enclosing a space craft 22 according to the present invention. The last stage 20 of the rocket comprises a tubular support member 24 to which is hingedly fastened, as at 26, a pair of shell or housing members 28 and 30. Tubular member 24 supports space craft 22 while the rocket 20 is in its "launch" position and while the final stage of the rocket is in flight. At a preselected moment the housing members 28 and 30 are caused to open as the phantom lines indicate at 28a and 30a to enable the space craft 22 to be released. As will be readily understood by those persons skilled in the art, this latter operation will take place only when the final stage of the rocket is in the proper position, and may be effected upon command from the space craft or a control center, or it may be automatically effected upon the occurrence of a predetermined set of conditions. For instance, one method for releasing the craft from the last stage of the rocket may include inflating the tires of the craft so as to cause the housing members 28 and 30 to be forced open so as to retard the forward motion of the last stage and thereby permit the craft 22 to float free. Such feature, of course, does not constitute a part of the instant invention and the apparatus for accomplishing this is not shown in the drawings.

Referring to FIGURE 5 of the drawings, the space craft 22 comprises a tubular inner shell 32 provided with a pair of opposite end walls 34, only one of which is shown in the drawing. Inner shell 32 extends substantially the entire length of the craft and is formed symmetrically about its midpoint, as is the entire craft as shown in FIGURES 1–4 inclusive.

Inner shell 32 is formed with a partition wall or bulkhead 36 near each end thereof to provide a pair of hermetically sealed passenger compartments 38 separated by a cargo or storage compartment 40. Each partition wall 36 is provided with an airlock 42 having an arcuately shaped stationary frame 42a sealingly fixed within the partition wall, and a rotatable chamber 42b within such frame. As will be readily understood by those persons skilled in the art, chamber 42b is rotatable between a position of exposure to passenger compartment 38 and a position of exposure to cargo compartment 40. The latter compartment is exposed to the space conditions wherein the craft is located whereas the passenger compartment 38 is provided with a controlled atmosphere for the survival and existence of human passengers. Due to the difference in such conditions, the airlock 42 is provided to enable the passengers, who may or may not be the operators of the space craft, to freely leave and enter passenger compartment 38.

Within chamber 40 and positioned along the midsection of the craft is a gyroscope 46 which, referring to FIGURE 7 of the drawings, may be encased within a housing 46a firmly fixed to inner shell 32 by support means 46b. Gyroscope 46 is of standard construction in that it comprises a gyroscopic wheel 46c which is rotated by a source of power 46d to stabilize inner shell 32 so as to provide a plane of reference for operation and adjustment of various components of the craft to be hereinafter described.

The midsection of inner shell 32 is provided with several circumferentially spaced openings 48 which constitute passageway means for the space travelers and cargo, and also effectively decrease the weight of the entire craft. To strengthen such midsection of the inner shell, there is provided a plurality of gusset plates or support members 50 circumferentially spaced about such midsection and extending longitudinally of the craft.

A tubular outer shell 52 is positioned about each end of inner shell 32, there being bearing means 54 at one end of shell 52 and bearing means 56 at the other end thereof. Bearing means 54 comprises an inner race 54a fixed to the external surface of inner shell 32 and an outer race 54b fixed to the internal surface of outer shell 52. A plurality of ball bearings 54c is interposed between such inner and outer races. Bearing means 56 comprises an inner race 56a fixed to inner shell 32 and a hollow outer race 56b fixed relative to outer shell 52. A series of ball bearings 56c is operatively interposed between inner race 56a and outer race 56b.

Mounted on each outer shell 52 is a large balloon-like pneumatic tire 58 which circumscribes the respective one of the passenger compartments 38. As shown in FIGURE 5, tire 58 may be fastened to shell 52 by the same fastening means employed to fix the outer races 54b and 56b to shell 52. Referring to FIGURE 5a of the drawings, it is seen that the fluid medium such as helium for inflating tire 58 is stored within the annular space 56d of the hollow body of outer ball bearing race 56b.

A control valve-regulator 60 as diagrammatically illustrated in FIGS. 5 and 5a controls communication between such annular space 56d and the interior of tire 58. In this regard, it is contemplated that regulator 60 will be operable to maintain a predetermined pressure differential between the space 61 between the inner and outer shells 32 and 52 and the interior of the tire 58. It is seen the inflating medium from storage 56b passes through conventional pressure regulating valve 60 into tire 58. Since the pressure regulating valve is normally actuated in space or near-vacuum conditions, additional pressure is automatically added to tire 58, as craft enters heavier atmosphere. It is contemplated that space 61 will be exposed to the prevailing space conditions wherein the space craft is located so that the tires 58 will thereby always be inflated to the same relative pressure. That is, if it were desired to maintain the air pressure within tire 58 at 2 lbs. per square inch above the pressure outside the space craft, the absolute pressure within each tire 58 would be on the order of 16.7 lbs. per square inch when the craft is at sea level on the planet Earth, whereas it might be only 2 lbs. per square inch absolute when in outer space where no atmospheric pressure exists. In any event, it is contemplated that pressure regulator 60 will maintain the predetermined pressure differential such as to maintain tire 58 in proper operating condition.

As seen most clearly in FIGURE 1, the tires 58 are folded about the outer shell 52 when the space craft 22 is positioned within the final stage 20 of the rocket.

Under these conditions, of course, each of the tires 58 is entirely deflated to enable the craft to be completely stored within the rocket. After the space craft is released from the last stage of the rocket, each of the valves 60 will be operable to inflate the respective tire 58 upon command from the space traveler within the craft or automatically upon occurrence of a predetermined set of conditions.

Fixed to each end of shell 32 is a wing-motor assembly 62. Each such assembly comprises a wing 64 and a centrally located wing tube 66 which extends through the respective end wall 34 of inner shell 32. Wing tube 66 is rotatably positioned within end wall 34, there being sealing means which may take the form of O-rings 68 positioned within a suitable opening in a retaining ring 70. The inner end of wing tube 66 is provided with a control panel-operating wheel 72 within the passenger compartment 38. For reasons which will hereinafter be explained, wheel 72 enables the space traveler within compartment 38 to rotate wing 64.

To firmly retain wing tube 66 in a given position, there is provided brake means 74 which may take the form of a brake shoe 74a which is pivotally movable between engaged and disengaged positions with tube 66 by means of a hydraulic or pneumatic system 74b. FIGURE 5 of the drawings shows the use of several brake assemblies 74, but it is realized that any number of such units may be employed without departing from the scope and spirit of the present invention.

Firmly attached to one end of outer shell 52 is a hood or shroud 76 provided with a central opening 76a. A bushing 78 is positioned about wing tube 66 and within opening 76a in firm engagement with hood 76, which also serves as compartment 38's outer protecting wall or meteor bumper. Bushing 78 is further provided with external gear teeth as shown at 78a.

To effect rotation of each of the aforedescribed balloon-like tires 58, there is provided on each wing 64 a pair of motors 80 and 82, each of such motors being provided with a sprocket 80a and 82a, respectively, there being an endless chain 84 about such sprockets and in engagement with the external gear teeth 78a of bushing 78 as shown in FIG. 8 and FIG. 9. Due to this arrangement, operation of motors 80 and 82 while wing 64 is secured to inner shell 32, with the brake 74 in a stationary position causes the endless chain 84 to rotate bushing 78 to thereby rotate the respective tire 58 about the inner shell 32 as will hereinafter be explained in greater detail. Conversely, in the event the outer shell 52 is rigidly positioned with respect to inner shell 32 and brakes 74a are released, operation of such motors will effectively rotate the wings 64 about their axes.

Brake 74E is relatively secured to inner shell assembly 32, and engages member 54b, part of outer shell assembly of which tire 58, is a part. The opposite side consists of similar arrangement, thus when the controllable motors, port and starboard 80, 82 will be rotating precisely the same speed the craft will move in a straight line, but if speed of said motors either port or starboard is decreased, speed of balloon tire 58 on corresponding side is lessened, consequently the craft will turn to the corresponding side. Another way to turn the craft laterally in a desired direction is to apply brake 74E on the corresponding side. To slow down or to stop the balloon tires 58 from rotating, brakes 74E on both sides are desirably applied in unison.

One of the desirable features of the present invention lies in the use of the aforedescribed motors 80 and 82 and the endless chain 84 for driving the tires 58. That is, when it is desired to drive the large balloon-like tires 58 for propelling the craft over a surface, the wing tube 66 is locked to the inner shell 32 by means of brakes 74. This arrangement prevents the occurrence of extraneous forces which tend to rotate the wings with respect to inner shell 32. This arrangement is far superior to the use of a single motor. The operation of the gyro 46, stabilizes the vehicle and maintains the inner shell 32 relatively stationary, while the balloon-like tires 58, or wings 64, are rotated with respect thereto. However, it will be understood that during the craft's travel in space, air, or performing a jump, and to prevent said craft from rotating on its axis with the spinning gyro, the operation of a double-wheel gyro is required, said double wheels rotate in opposite directions with controllable variable speed in order to stabilize said craft, as will be readily understood by those persons skilled in the art. The mechanism of the double-wheel gyro has not been shown in this application as it is designed by those persons skilled in the art of gyro designing and construction.

As a source of power for energizing motors 80 and 82, there is provided turbines 84 and 86 which are connected to solar energy means 88 for accumulating the energy from the Sun. Accumulator 88 may comprise a concavo-convex member 88a which is provided with a highly polished reflective concave surface 88b. Member 88a is mounted on wing 66 by means of support members 90.

It is contemplated that reflector 88a will be so formed that the polished surface 88b thereof will have a substantially straight focal line. Positioned along such focal line is a plurality of convolutions 92 of tubing 94 which is connected to generators 84 and 86 as at 94a and 94b. It is contemplated that the solar energy device 88 will be directed toward the Sun, the heat intensity of which, as is readily understood by people well informed in the art, is extremely high above the Earth's atmosphere. That is, without the filtering effect of the atmosphere, the Sun's rays provide very intense heat. Conversely, the absence of such atmosphere also causes the shady sides of objects to be extremely cold. Thus, there is provided on wing 64 opposite solar energy means 88, cooling means 96 in the form of a plurality of convolutions 98 of tubing 100, the opposite ends of which are attached to turbines 84 and 86. It is contemplated that by means of such heating and cooling devices, the turbines 84 and 86 can be operated, and generating means associated with such turbines can be employed for energizing the motors 80 and 82 as aforedescribed. Or it will be seen upon examination of the device as shown in FIG. 8, that the reflector 88a is occupied by convolution of pipes 92 interconnected to the turbines 84 and 86; said pipes contain a working medium such as carbon dioxide or mercury vapor, which is highly heated, then expands in the multi-stage turbine 84 and 86, passes through heat exchange 96, then returns to the focal line of mirrors 88b, thus completing the cycle. A circulating pump (not shown) may be operatively connected between heat exchanger 96 and pipes 92 to regulate the flow of working medium.

In the alternative, electrical batteries and solar cells could be carried on the wings and inside body 32 (not shown) of the space craft for powering the motors 80 and 82.

Rotatably positioned within the outer end of each wing tube 66 is a rocket motor 102 which is used to change the course of the craft or to decrease its speed when entering the atmosphere. As aforedescribed, in situations such as chasms, crags and plateaus, the craft performs jumps impelled by properly positioned rocket motors 102 as shown in FIG. 2. At the present time the preferable working medium for the said rocket motors is that of a self-igniting hypergol, which is powerful enough to overcome the weak gravitational pull of the Moon for the craft's return trip to Earth, providing sufficient fuel was placed on the Moon for such purpose. For positioning rocket motor 102 with respect to wing tube 66 there is provided a gear member 104 which cooperates with a bevel gear 106 mounted on the end of a shaft 108. The other end of shaft 108 is connected to a manually operable handle 110 positioned on the axis of control panel-operator 72. It is thus seen that rotation of handle 110 causes bevel gear 106 to rotate thereby effecting rotation of motor 102 with respect to wing tube 66. With this arrangement, it is possible to direct the rocket motors such as to move the craft through outer space in any desired direction.

For purposes of navigation, there is provided a pair of periscopes 112 and 114 which extend through control panel 72 and terminate in extensible eye pieces 112a and 114a, respectively. Each of such scopes is provided with a right angle bend and suitable reflective means for transmitting the image around such bend. The scopes 112 and 114 are extended through the wing tube 66 in opposite directions to afford means for enabling the space traveler within passenger compartment 38 to view the surroundings.

It is contemplated that control panel 72 will carry various types and kinds of meters and indicators whereby the pilot of the space ship can be quickly informed as to the condition of his various pieces of equipment.

Referring to FIGURE 3 of the drawings, it is seen that the balloon-like tires 58 are extremely large and pliable even when inflated. This is very desirable in order to provide the necessary flexibility when travelling over irregular terrain. That is, as one of the tires 58 meets an obstacle, it will deform accordingly due to the aforedescribed pressure regulating means so as to maintain the passenger compartments and main axis of the space craft in a given horizontal position. On deep dusty surface, both tires 58 are desirably deflated to provide the craft with large surface contact area so that the craft will not sink into dust. The arrangement of a workable device regulating periphery tire pressure has not been shown in this application, as it is achieved by any means known by persons well informed in the art. It is also contemplated that a ladder may be extended through the openings 48 in the midsection of the craft to permit of ingress and egress of passengers.

It is also contemplated that upon re-entering the Earth's atmosphere it may be advisable to jettison part of the disposable equipment such as the solar energy means to lighten the craft and to enable the wings to perform their desired functions in gliding the craft to a safe landing, as shown in FIG. 4. The craft design is not influenced by tradition, and the Moon's neglible atmospheric drag completely ignored.

It is thus seen that the present invention teaches the construction and plurality of operations of a space craft which can be used for exploratory operation along the surface of a planet, and is operable to re-enter the Earth's atmosphere in a proper manner such as the craft making a slowing down orbit of the Earth, by gliding and skipping the craft atop the atmosphere.

Although I have shown and described certain specific embodiments of my invention, I am fully aware that many modifications thereof are possible. The invention itself therefore is not to be restricted except insofar as is necessitated by the prior art and by the spirit of the appended claims.

I claim:

1. In a vehicle for space and surface travel, the combination of, a housing, at least one inflatable balloon-like tire rotatably mounted on said housing, wing members rotatably mounted on each end of said housing, and means for rotating said tire with respect to said housing comprising a pair of motors mounted on at least one of said wing members and transmission means operatively interposed between said tire and said motors, means for locking said wings or tire to said housing and a suitable gyro for stabilizing said vehicle and maintaining said housing relatively stationary while the balloon-like tire or wings are rotated with respect thereto whereby simultaneous operation of said motors effects rotation of said tire with respect to said housing.

2. In a vehicle for space and surface travel, the combination of, a housing, at least one inflatable balloon-like tire rotatably mounted on said housing, a drive gear fixed to said tire, wing members rotatably mounted on each end of said housing, and means for rotating said tire with respect to said housing comprising a pair of motors mounted on at least one of said wings equidistant from said drive gear, said rotating means further including a drive sprocket on each of said motors and in endless chain therebetween and connected to said drive gear, means for locking said wings or tire to said housing and a suitable gyro for stabilizzing said vehicle and maintaining said housing relatively stationary while the balloon-like tire or wings are rotated with respect thereto whereby simultaneous operation of said motors effects rotation of said tire with respect to said housing.

3. In a vehicle for space and surface travel, the combination of, an elongated tubular housing, a tubular sleeve coaxially positioned on said housing, bearing means interposed between said housing and said sleeve, means fixed to said sleeve forming a balloon-like tire rotatable on said housing, wings rotatably mounted on each end of said housing, means for rotating said tire with respect to said housing including at least one electric motor mounted on said wings and power transmission means interposed between said motor and said sleeve, energizing means for said motor including solar energy means mounted on said wings for converting heat energy from the Sun into electrical energy for said motor, means for locking said wings or tire to said housing and a suitable gyro for stabilizing said vehicle and maintaining said housing relatively stationary while the balloon-like tire or wings are rotated with respect thereto.

4. In a vehicle for space and surface travel according to claim 3 wherein said energizing means further includes generator means operatively connected to said solar energy means for converting the heat energy to electrical energy for said electric motor.

5. In a vehicle for space and surface travel according to claim 3 wherein said solar energy means comprises a concave heat reflector and a plurality of convolutions of conduit filled with a heat absorbing medium, said convolutions being positioned at substantially the focal point of said reflector, whereby the medium within said conduit is heated by the Sun.

6. In a vehicle for space and surface travel according to claim 3 wherein means is provided for directing said heat reflector toward the Sun, and wherein said solar energy means further includes conduit means fixed to said wing members on the side thereof opposite said reflector, said conduit means being connected to said convolutions at the focal point of said reflector for cooling the medium as it circulates through said conduits and conduit means.

7. In a space vehicle for both space and surface travel, the combination of, an elongated tubular housing having partition walls affording an hermetically sealed passenger compartment at each end thereof, an air lock passageway for each of said compartments for permitting ingress and egress of passengers without destroying said hermetic seal, a wing member on each end of said housing and rotatable with respect thereto by control means within said passenger compartment means for locking said wing to said housing, a rocket motor at one end of each of said wing members rotatable with respect to said housing by control means within the respective compartment, a pair of inflatable balloon-like tires rotatably mounted in spaced relation to said housing, and means for rotating said tires on said housing including solar energy means mounted on said wings and motors energized by said solar energy means drivingly connected to said tires and a suitable gyro for stabilizing said vehicle and maintaining said housing relatively stationary while the balloon-type tires or wings are rotated with respect thereto.

8. In a space vehicle for both space and surface travel, the combination of, an elongated tubular housing having partition walls affording an hermetically sealed passenger compartment at each end thereof, a gyroscope mounted within said housing between said passenger compartments operable to provide a plane of reference for said space vehicle, an air lock passageway for each of said compartments for permitting ingress and egress of passengers without destroying said hermetic seal, a wing member on each end of said housing and rotatable with respect thereto by control means within said passenger compartment means for locking said wings to said housing, a rocket motor mounted in each of said wing members rotatable with respect to said housing by control means within the respective compartment, a pair of inflatable balloon-like tires rotatably mounted in spaced relation on said housing, and means for rotating said tires on said housing including solar energy means mounted on said wings and motors energized by said solar energy means drivingly connected to said tires.

9. In a space vehicle for both space and surface travel, the combination of, an elongated tubular housing having a pair of spaced partition walls affording hermetically sealed passenger compartments separated by an intermediate compartment, a gyroscope fixed to said housing within said intermediate compartment, an entry way formed in the tubular housing at said intermediate compartment to permit passengers to enter and leave said intermediate compartment, an air lock passageway in each of said partition walls for permitting ingress and egress of passengers from said intermediate compartment to the respective passenger compartment without destroying said hermetic seal, wing members rotatably mounted on each end of said housing and rotatable with respect thereto by control means within said passenger compartment, means for locking said wings to said housing, a rocket motor mounted in each of said wing members rotatable with respect to said housing by control means within said compartments, a pair of inflatable balloon-like tires rotatably mounted in spaced relation on said housing, and means for rotating said tires on said housing including solar energy means mounted on said wings and motors energized by said solar energy means drivingly connected to said tires.

References Cited by the Examiner
UNITED STATES PATENTS

| | | | |
|---|---|---|---|
| 584,127 | 6/1897 | Draulette et al. | 180—29 |
| 2,415,056 | 1/1947 | Wheeler | 180—21 |
| 2,730,626 | 1/1956 | Varney | 244—97 |
| 2,756,830 | 7/1956 | Hurthig | 180—10 |

FERGUS S. MIDDLETON, *Primary Examiner.*